No. 638,103. Patented Nov. 28, 1899.
E. F. EDGECOMB.
PHOTOGRAPHIC SHUTTER.
(Application filed Jan. 23, 1899.)

(No Model.) 2 Sheets—Sheet 1.

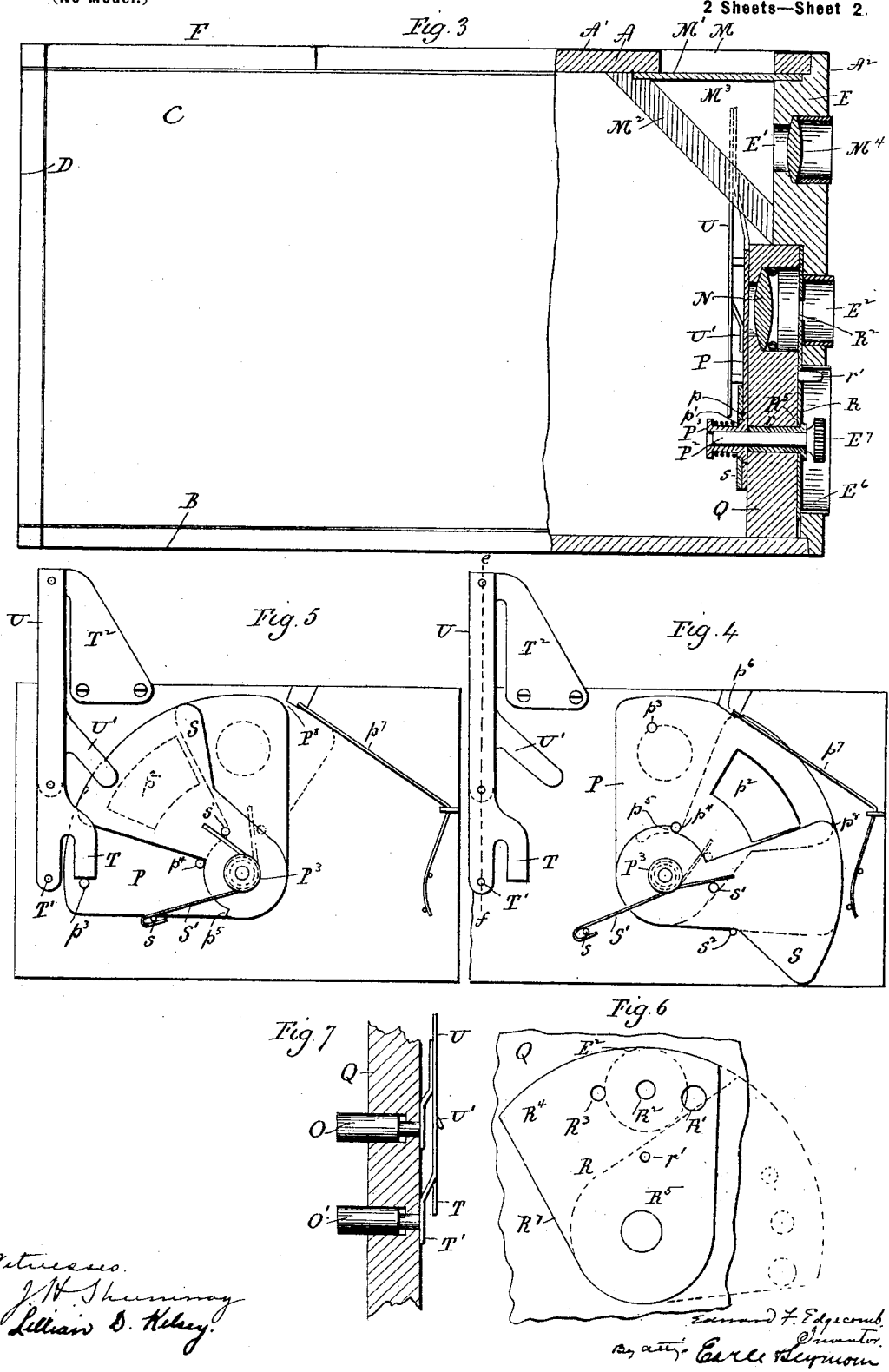

UNITED STATES PATENT OFFICE.

EDWARD F. EDGECOMB, OF NEW HAVEN, CONNECTICUT, ASSIGNOR, BY MESNE ASSIGNMENTS, TO THE E. & H. T. ANTHONY & COMPANY, OF NEW YORK, N. Y.

PHOTOGRAPHIC SHUTTER.

SPECIFICATION forming part of Letters Patent No. 638,103, dated November 28, 1899.

Application filed January 23, 1899. Serial No. 703,042. (No model.)

*To all whom it may concern:*

Be it known that I, EDWARD F. EDGECOMB, of New Haven, in the county of New Haven and State of Connecticut, have invented a new Improvement in Portable Cameras; and I do hereby declare the following, when taken in connection with the accompanying drawings and the letters of reference marked thereon, to be a full, clear, and exact description of the same, and which said drawings constitute part of this specification, and represent, in—

Figure 1:
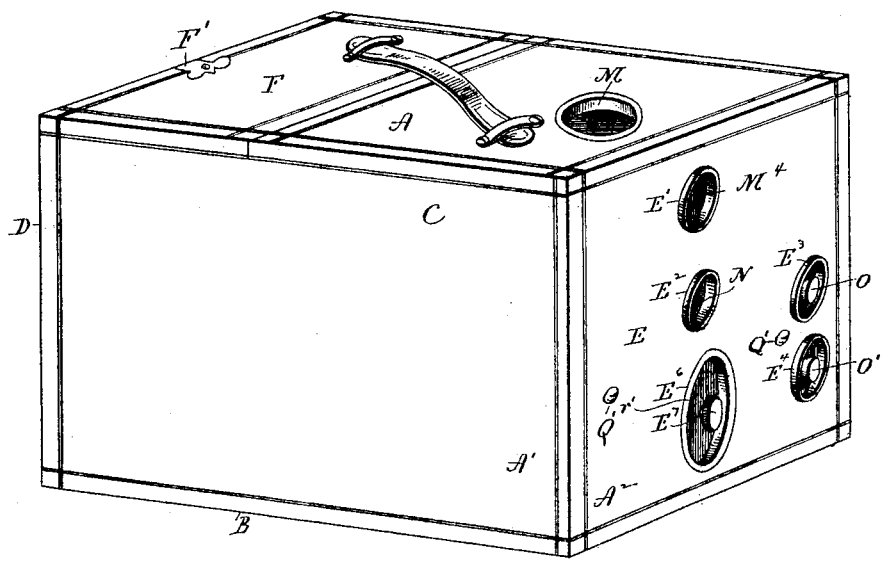
Figure 2:
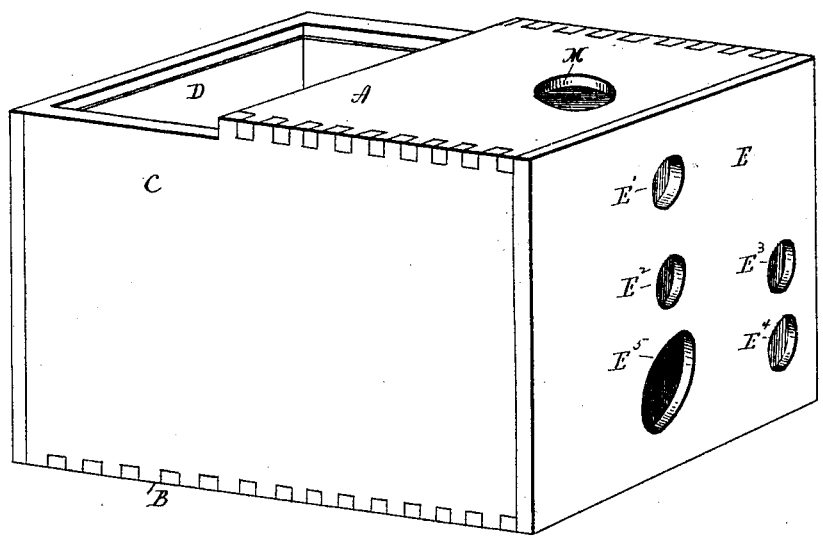

Figure 1, a perspective view of a camera containing my invention; Fig. 2, a perspective view of the camera-box stripped of its covering and with its door removed; Fig. 3, a view of the camera, partly in side elevation and partly in vertical longitudinal central section; Fig. 4, a detached view in front elevation of the movement-block with the shutter and blind in their normal positions; Fig. 5, a similar view showing the shutter and block as set preparatory to an exposure and ready for the pressure of one or both of the buttons; Fig. 6, a detached broken view showing the stop in front elevation; Fig. 7, a broken sectional view on the line $e\,f$ of Fig. 4, showing the time and instantaneous buttons, together with their coacting springs.

My invention relates to an improvement in portable cameras, the object being to locate the shutter mechanism and its various related instrumentalities in a movement-block capable of being readily introduced into and removed from the camera-box to arrange the instantaneous and time buttons at the front end of the box, so that they may be operated without danger of moving it in either direction at the time the exposure is made.

With these ends in view my invention consists in a camera having certain details of construction and combinations of parts, as will be hereinafter described, and pointed out in the claims.

In illustrating my invention I have shown a box consisting of a top A, a bottom B, sides C C, rear end D, and forward end E. The said members are permanently united together by dovetailing or in any other approved manner. I particularly wish to call attention to the fact that this box is complete in itself as distinguished from cameras in which the shutter instrumentalities are mounted directly in the part closing the forward end of the camera-box.

The forward portion of the top A of the box is formed with a circular finder-window M, closed by a ground-glass finder-plate M', which is placed above a finder-mirror $M^2$, arranged in an inclined position within an inclosed chamber $M^3$, located in the forward upper corner of the box, as seen in Fig. 3. This chamber is intersected by an opening E', formed in the forward end E of the box for the reception of the finder-lens $M^4$, which is located directly above the opening $E^2$, formed in the forward end of the box for the reception of the operating-lens N. The front end of the box is also formed, near its right-hand edge, with openings $E^3$ and $E^4$ for the forward projection through them of the time-button O and the instantaneous button O'. Below the operating-lens opening is a large opening $E^5$, receiving a sheet-metal cup $E^6$, within which is located a knurled stop-operating button $E^7$, as will be hereinafter described.

The shutter P and all of the instrumentalities which coact with it in the operation of the camera are mounted upon a movement-block Q, which is adapted to be introduced into the box and secured to the rear face of the forward end E thereof by means of screws Q' Q' after the said shutter and allied instrumentalities have been assembled and timed upon it. The advantage of this is obvious, as it permits the shutter and its allied instrumentalities to be accurately assembled and adjusted and put in place after the box itself has been completed.

Furthermore, the construction described secures a great economy in the construction of the camera, as it enables the camera-box to be made and finished independently of the shutter mechanism and the same to be fully organized and timed in the movement-block before the same is introduced into the box. On the other hand, when the shutter instrumentalities are mounted directly in the front of the camera-box the same must be made and covered independent of its front and the front made and covered independent of the box and attached thereto after the shutter instrumentalities have been mounted in it. This construction is not only expensive, but open to the objection that under the most favorable conditions and when the greatest care is exercised the light can never be as perfectly excluded from the box as when the front of the box is permanently attached thereto, so as to be virtually integral therewith and covered at the same time the box is covered, for no matter how carefully an independently made and covered front may be applied to an independently made and covered box there will be more opportunity offered for the entrance of light than when the box is made in accordance with my invention. Moreover, it is necessary with a camera constructed in the old way to remove the front for access to the shutter mechanism, and the more times this is done the greater will be the likelihood of failure to secure a light-tight joint in replacing the front. Again, the atmospheric influence upon the wood of which the box is made will be likely to open the joint somewhere and permit the entrance of light into the box. All of these objections are completely overcome by my invention, which permits, as aforesaid, the front of the box to be permanently attached to it before the box is covered, and as the front is never disturbed thereafter no usage of the box short of actually breaking it can result in letting light into it through or by its front. In accomplishing these ends I employ a removable movement-block on which the shutter instrumentalities are mounted and which is adapted to be inserted into and removed from the box through the opening in its rear portion. When this movement-block is in the box, it is placed against the true front of the box, but in no sense takes the place thereof, because the block is not relied upon to exclude light from the box.

Referring now to the instrumentalities mounted upon the movement-block, I will begin their description not with the said shutter P, but with the stop R, Fig. 6, which consists of a sector-shaped plate having stop-openings $R'$, $R^2$, and $R^3$, graduated in size in the order in which they are designated. These stop-openings are not regularly spaced between the two edges of the sector-shaped stop-plate, but are arranged, so to speak, in a group very much nearer to one edge of the plate than to the other edge thereof, the center of the said group of stop-openings being located considerably to one side of the longitudinal center of the plate. The outer portion of the stop-plate therefore has a relatively large imperforate area $R^4$. Near its lower end the stop is formed with a circular opening $R^5$, adapting it to be mounted upon a sleeve $r$, which is itself transversely mounted in the movement-block and formed at its forward end with a flange, which engages with the forward face of the stop, which is thus positioned, so to speak, upon the sleeve, on which it is free to have oscillating movement, though under sufficient frictional restraint to prevent it from being accidentally displaced. A pin $r'$, projecting forward from the stop into the sheet-metal cup $E^6$, provides for the manual operation of the stop to bring any one of its stop-openings or its imperforate area $R^4$ into range with the operating-lens N. It will be understood, of course, that the stop is set so as to bring that one of the stop-openings into range with the lens which will admit thereto the amount of light necessary at the time of using the camera. By swinging the stop way to the right its imperforate area $R^4$ is brought over the lens, from which it excludes all light, and thus supplements the action of the shutter. On the other hand, the stop is arranged so that by swinging it to the limit of its movement from left to right its edge $R^7$ will be entirely cleared from the operating-lens opening $E^2$, so as to permit the operating-lens N to be got at for the purpose of cleaning the same. In Fig. 6 of the drawings the stop is shown as swung into this position by broken lines.

A shutter-operating button $E^7$, having a long stem $P^2$, is mounted in the sleeve $r$ aforesaid, the said button being therefore located centrally within the cup $E^6$ and exposed for ready operation by the fingers of the user of the camera and the said stem extending inwardly through the sleeve and projecting beyond the same and having a hub $P^3$ secured to it, the forward end of the said hub being formed with shoulders $p$ and $p'$. The shutter P is loosely mounted upon the said shoulder $p'$, so as to turn freely thereupon and so as to be in close contact with the inner face of the movement-block Q, the said shutter being formed with the usual segmental exposure-opening $p^2$, with a catch-pin $p^3$, and with an operating-stud $p^4$.

A blind S is mounted upon and rigidly secured to the shoulder $p'$ aforesaid of the hub $P^3$, as shown in Fig. 3. A spring $S'$ connected at one end to the movement-block by means of a pin $s$, is coiled upon the hub $P^3$, as shown in Fig. 3, and arranged to engage with a short stud $s'$, carried by the blind, which the spring moves from right to left, carrying the shutter with it. The movement of the blind and shutter from right to left is limited by means of a stop-pin $s^2$.

The operating-stud $p^4$, mounted in the shutter P, is arranged in position to be engaged by the inner edge of the blind as the same is swung by the rotation of the operating-stem $P^2$ from left to right, whereby the blind is caused to "pick up" the shutter, so to speak, after which the blind and shutter move together from left to right until the catch-pin $p^3$ has been engaged with the catch-pin finger T of the catch-spring $T'$; but the blind does not engage with the operating-stud $p^4$ until after it has moved over and completely covered the exposure-opening $p^2$ of the shutter. The blind is also formed with a shoulder $p^5$, which coacts with the operating-stud $p^4$, as will be hereinafter described.

The time-spring T' is a long spring and connected by its upper end with an arm T², secured to the inner face of the upper edge of the movement-block, the lower end of the said spring being connected with the inner end of the time-button O', which is transversely mounted in the movement-block, as clearly shown in Fig. 7. The instantaneous button O is also mounted in the said block at a point directly above the button O', and connected with the lower end of the instantaneous spring U, which is also connected at its upper end with the arm T² and formed with a catch-spring finger U'. It will be observed by reference in particular to Fig. 7 that the instantaneous spring is located beneath the time-spring. Under this arrangement when the instantaneous spring is operated by the instantaneous button both springs will be lifted so as to clear the catch-pin P³. On the other hand, when the time-spring is operated by the time-button the instantaneous spring is not disturbed, but must be subsequently operated by means of the instantaneous button in order to complete the operation of a time-exposure.

For the purpose of preventing the shutter from being displaced I form a locking-notch $p^6$ in its edge and employ a locking-spring $p^7$, which is secured in any suitable manner to the inner face of the movement-block. For the purpose of lifting the said spring out of the said notch I employ the blind the forward upper corner of which is rounded as at $p^8$. Under this construction when the blind has been swung so as to completely cover the exposure-opening of the shutter its rounded corner $p^8$ engages with the spring $p^7$ and lifts the same out of the locking-notch $p^6$ of the shutter, which is then unlocked and freed for being swung from left to right by the blind, which engages with the operating-stud $p^4$ of the shutter just at the time that the same is unlocked.

In operating the camera the stop is set as required by means of its operating-pin $r'$. The operating-button P' is then grasped by the fingers and turned from left to right, whereby the blind S is swung from left to right, so as to entirely cover the exposure-opening $p^2$ in the shutter P. The rounded corner $p^8$ of the blind then engages with the locking-spring $p^7$ of the shutter P, so as to lift the said spring out of the locking-notch $p^6$, formed in the edge of the shutter. The shutter thus being unlocked has its operating-stud $p^4$ engaged by the forward edge of the blind, which then operates to swing the shutter with it, whereby the shutter is carried around to its full open position, as shown in Fig. 5, in which it is retained by the engagement of its catch-pin $p^3$ with the catch-pin finger T of the time-spring T'. The operating-button P' being then released the blind is swung by its spring S' from right to left until it reaches a vertical position, in which it supplements the action of the shutter in covering the operating-lens opening, as shown in Fig. 5, and in which it is held by the engagement of its shoulder $p^5$ with the operating-stud $p^4$ of the shutter, the exposure-opening of which is now cleared by the blind. If an instantaneous exposure is desired, the instantaneous button O' is now pushed, whereby both of the springs are moved so as to clear their fingers T' and U' from the path of the catch-pin T, permitting the shutter to be instantaneously swung back into its normal position, in which it is stopped by the stop-pin S². It will be understood, of course, that the shutter is swung back into engagement with the stop-pin S² by the bearing of the shoulder $p^5$ of the blind, which is under the tension S⁷, against the operating-stud $p^4$. If, on the other hand, a time-exposure is desired, the time-button O' is operated, whereby the time-spring T' is lifted, so as to clear the catch-spring finger T from the path of the catch-spring, which will pass it and engage with the catch-spring finger U', which will arrest the shutter with its exposure-opening $p^2$ in line with the operating-lens. Then after the required interval has elapsed the instantaneous button O' is pushed so as to lift the catch-spring finger U' away from the catch-pin and allow the shutter to fly back to its normal position, in which it closes the operating-lens opening. In this connection I wish to call particular attention to the fact that the time and instantaneous buttons project through the forward end of the box of the camera and are located so near each other that they may be operated interchangeably without moving either the hand or the camera. This is of the highest importance, as it reduces to the minimum the danger of moving the camera during the exposure. In this respect my camera is an improvement over other cameras in which one or both of the buttons have been located in the sides or on the top of the box and separated from each other, so as to require a shifting of the hands for their operation, the shifting of the hands endangering the movement of the camera and the body.

It is apparent that in carrying out my invention some changes from the construction herein shown and described may be made. It is also apparent that it is not essential that all of the improved features herein described be used in the combination, but that they may be used independently or in any combinations desired. I would therefore have it understood that I do not limit myself to the exact construction herein shown, but hold myself at liberty to make such changes as fairly fall within the spirit and scope of my invention.

Having fully described my invention, what I claim as new, and desire to secure by Letters Patent, is—

1. The combination with a camera-box formed in its rear portion with an opening and having a permanently-applied light-excluding front end formed with a lens-opening, and with openings for the shutter-operating instrumentalities; of a removable movement-block adapted to be introduced into and removed from the said box through the opening in the rear portion thereof and to be located, when in the box, against the inner face of the permanent front end thereof; and shutter instrumentalities mounted upon the said block, and operated through the permanent front end of the box.

2. In a camera, the combination with the camera-box, of a lens mounted in the front end thereof, and shutter instrumentalities including a reciprocating time-button and a reciprocating instantaneous button, both of which are arranged for operation through the front of the box, whereby both buttons may be operated by inward pressure exerted upon them in lines parallel with the length of the box and hence with the axial line of the lens.

3. In a camera, the combination with the box thereof, of shutter instrumentalities including an instantaneous button and a time-button arranged to be operated through the front of the box, an instantaneous spring and a time-spring for coaction with the said buttons respectively, a shutter provided with a catch-pin adapted to be engaged by either one of the said springs, and a spring-actuated shutter-blind coacting with the shutter to operate the same, whereby both buttons may be operated by inward pressure exerted upon them in lines parallel with the length of the box and hence with the axial line of the lens, and whereby when the instantaneous button is operated both springs are acted upon, and when the time-button is operated the time-spring alone is acted upon.

4. A camera having a shutter formed with a locking-notch in its edge, a spring adapted to enter the said notch for holding the shutter in its normal or closed position, and a shutter-blind engaging directly with the said spring to lift it out of the locking-notch of the shutter preparatory to bringing the same into position for making an exposure.

5. The combination with a camera-box, of a removable movement-block adapted to be introduced thereinto, a sleeve mounted in the said block, a stop formed with graduated openings mounted upon the forward end of the said sleeve for oscillation independently thereof, and located between the inner face of the forward end of the box and the forward face of the block, a spindle passing through the said sleeve, and furnished at its forward end with an operating-button by means of which it is manually turned, a spring-actuated shutter-blind, permanently connected with the projecting rear end of the said spindle, and a shutter interposed between the inner face of the block and the forward face of the shutter-blind, and having its center of oscillation concentric with the center on which the blind operates.

6. In a camera, the combination with the lens thereof, of a stop-plate having stop-openings, and constructed to be swung upon its pivot so as to entirely clear the opening in which the lens is located to permit access to the said opening for the purpose of cleaning the lens.

7. In a camera, the combination with a camera-box having a permanently-attached front end and having an opening formed in its rear portion, of a removable movement-block adapted to be introduced into and removed from the said box through the opening in the rear portion thereof, and, when in the box, to be placed against the inner face of the permanently-attached front end thereof; and shutter instrumentalities mounted upon the said block with which they are removed from and inserted into the box, including a stop-plate mounted upon the said block so as to be interposed between its front face and the inner face of the permanently-attached front end of the box, the said plate being formed with stop-openings and constructed to be swung to one side beyond the opening of the lens to permit access to the said opening for the purpose of cleaning the same.

8. In a camera, the combination with a camera-box having a permanently-attached front end, and formed in its rear portion with an opening, of a removable movement-block adapted to be introduced into and removed from the box through the said opening therein, and shutter instrumentalities mounted upon the said block with which they are removed from and inserted into the box, the said instrumentalities including a shutter, and a stop-plate interposed between the said shutter and the rear face of the block, having stop-openings, and formed with an imperforate light-excluding portion, the said plate being arranged to be swung in one direction so as to entirely expose the lens-opening to permit access to the lens for cleaning the same, and to be swung in the opposite direction to bring its imperforate portion over the said opening to supplement the shutter in excluding light from the lens.

9. In a camera, a stop-plate having near one end a bearing upon which it oscillates, near the other end a plurality of stop-openings regularly disposed relative to the edges of the plate and located in a camera with reference to the lens thereof so that when moved to its extreme throw in one direction it swings clear of the lens-opening, when moved to its extreme throw in the contrary direction it fully covers the lens-opening, and so that in its several midway positions its said stop-openings are properly registered with the lens.

In testimony whereof I have signed this specification in the presence of two subscribing witnesses.

EDWARD F. EDGECOMB.

Witnesses:
FRED. C. EARLE,
GEORGE D. SEYMOUR.